(12) United States Patent
Ando et al.

(10) Patent No.: US 9,342,473 B2
(45) Date of Patent: May 17, 2016

(54) PARALLEL COMPUTER SYSTEM, CROSSBAR SWITCH, AND METHOD OF CONTROLLING PARALLEL COMPUTER SYSTEM ACCORDING TO SELECTIVE TRANSMISSION OF DATA VIA PORTS OF THE CROSSBAR SWITCH

(71) Applicant: FUJITSU LIMITED, Kawasaki-shi, Kanagawa (JP)

(72) Inventors: Shun Ando, Yokohama (JP); Shinya Hiramoto, Yokohama (JP); Tomohiro Inoue, Kawasaki (JP); Yuta Toyoda, Kawasaki (JP); Masahiro Maeda, Zama (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 457 days.

(21) Appl. No.: 13/921,327

(22) Filed: Jun. 19, 2013

(65) Prior Publication Data

US 2014/0047157 A1    Feb. 13, 2014

(30) Foreign Application Priority Data

Aug. 9, 2012    (JP) .................................. 2012-177390

(51) Int. Cl.
*G06F 13/00*    (2006.01)
*G06F 13/40*    (2006.01)

(52) U.S. Cl.
CPC .................................. *G06F 13/4022* (2013.01)

(58) Field of Classification Search
USPC ............................ 703/227–233; 710/306–317
See application file for complete search history.

(56) References Cited

U.S. PATENT DOCUMENTS

| 5,604,735 | A | * | 2/1997 | Levinson | ................. H04L 12/52 370/360 |
| 5,617,545 | A | * | 4/1997 | Ogata | ...................... G06F 13/18 710/113 |
| 5,754,792 | A | * | 5/1998 | Shutoh | ................. G06F 11/1443 709/243 |
| 6,061,345 | A | * | 5/2000 | Hahn | ...................... H04L 45/00 370/351 |
| 6,748,451 | B2 | * | 6/2004 | Woods | .................. G04G 15/006 370/345 |
| 7,830,902 | B2 | * | 11/2010 | Ichimiya | ............. G06F 13/1657 370/412 |
| 2014/0122771 | A1 | * | 5/2014 | Chrysos | .............. G06F 13/4022 710/317 |

FOREIGN PATENT DOCUMENTS

JP    11-73403    3/1999
JP    2001-22711    1/2001

* cited by examiner

*Primary Examiner* — Raymond Phan
(74) *Attorney, Agent, or Firm* — Staas & Halsey LLP

(57) ABSTRACT

A parallel computer system includes a plurality of processors including a first processor and a plurality of second processors; and a crossbar switch provided with a plurality of ports; wherein the first processor transmits data to a first port among the plurality of ports, and transmits standby time information to the first port in the case where the plurality of second processors are unable to transmit data to the first port despite receiving a communication authorization notification from the first port, and the first port receives the standby time information, and after the standby time elapses, selects one of the plurality of second processors.

13 Claims, 9 Drawing Sheets

PARALLEL COMPUTER SYSTEM, CROSSBAR SWITCH, AND METHOD OF CONTROLLING PARALLEL COMPUTER SYSTEM ACCORDING TO SELECTIVE TRANSMISSION OF DATA VIA PORTS OF THE CROSSBAR SWITCH

CROSS-REFERENCE TO RELATED APPLICATION

This application is based upon and claims the benefit of priority of the prior Japanese Patent Application No. 2012-177390, filed on Aug. 9, 2012, the entire contents of which are incorporated herein by reference.

FIELD

The embodiments discussed herein are related to a parallel computer system, a crossbar switch, and a method of controlling a parallel computer system.

BACKGROUND

With parallel computers and the like, the performance of the system as a whole is potentially improved by multiply connecting nodes such as central processing units (CPUs). In a network used by a parallel computer having such multiple nodes, the multiple nodes are tied together by a switch. In some cases, a device such as a crossbar switch is used for such a switch.

Some crossbar switches are provided with buffered ports, while others are provided with unbuffered ports due to material constraints or the like. In the case of using a crossbar switch provided with unbuffered ports, a handshake is conducted to, for example, synchronize data between a port of the crossbar switch and the node or other transmission source that supplies data to that port. One example of a handshake method involves transmitting an arbitration request from the transmission source to the crossbar switch, while the crossbar switch, upon receiving the arbitration request, replies to the transmission source with a transmit authorization. After going through this sequence, the transmission source transmits a data packet to the crossbar switch. An alternative method involves authorizing data transmission to a port for limited time periods to the multiple nodes in order.

In the case of using arbitration requests, upon receiving arbitration requests for data from multiple nodes, the crossbar switch conducts an arbitration process that determines which node from which to accept an arbitration request. A particular node obtains transmit authorization from the port that selected that node, and transmits a data packet to that port. With such an arbitration process, it is possible to use a method in which a node that has obtained transmit authorization from a given port deletes arbitration requests output to other ports, for example. Alternatively, it is possible to use a method in which a node that has obtained transmit authorization with a given port continues to send arbitration requests output to other ports.

There has been disclosed related technology that suppresses dead cycles in a crossbar switch by creating a wait time to arbitration for each port, with an arbitration device conducting arbitration after standing by for the wait time (see Japanese Laid-open Patent Publication No. 11-73403, for example). Also disclosed is related technology that sets a length of data in a counter after transmitting a data transfer authorization signal, periodically decrements the counter, and conducts the next arbitration process when the counter reaches 0 (see Japanese Laid-open Patent Publication No. 2001-22711, for example).

However, with the techniques of the related art, if using a method that continues to send arbitration requests, there is a possibility that, when a given node (hereinafter designated the "specific node") is selected by one port, another port may also conduct arbitration and select that specific node. In this case, the specific node receives transmit authorizations from the respective ports that selected the specific node, but the specific node transmits a data packet to the port from which transmit authorization was first received. Since the transmission of a data packet is conducted with respect to one port at a time, the specific node does not transmit a data packet to the other port that authorized transmission. During this time, the other port is already issuing transmit authorization to the specific node, and thus does not issue transmit authorization to another node. For this reason, even though there are other nodes able to transmit, the other port stands by until the specific node finishes transmitting a data packet.

Particularly, in order to conduct processing at high speed matching the ranking of output ports with high communication frequency and low communication frequency, it is conceivable to group and raise the priority of combinations of nodes and output ports with a high communication frequency. In this case, an output port grouped with a given node is prioritized for selection. Thus, when a node in a group is transmitting data to a paired output port, it is conceivable that the paired output port may be selected many times, even though another output port has sent transmit authorization to that node and is standing by. In this case, it is conceivable that the other output port will stand by until all data transmission to the paired output port is completed. As a result, there is a risk of the data transfer process hanging up.

Even the related technology that creates a wait time until arbitration for each port does not take into account the case of grouping combinations with high communication frequency, making it difficult to avoid grouped nodes and input/output ports monopolizing the bus. Even the related technology that sets a length of data in a counter and arbitrates on the basis of the counter does not take into account the case of grouping combinations with high communication frequency, making it difficult to avoid grouped nodes and input/output ports monopolizing the bus.

SUMMARY

According to an aspect of the invention, a parallel computer system includes a plurality of processors including a first processor and a plurality of second processors; and a crossbar switch provided with a plurality of ports; wherein the first processor transmits data to a first port among the plurality of ports, and transmits standby time information to the first port in the case where the plurality of second processors are unable to transmit data to the first port despite receiving a communication authorization notification from the first port, and the first port receives the standby time information, and after the standby time elapses, selects one of the plurality of second processors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a working example of the parallel computer system, crossbar switch, and method of controlling a parallel computer system disclosed in this application will be described in detail on the basis of the drawings. The parallel computer system, crossbar switch, and method of controlling a parallel computer system disclosed in this application are not limited by the following working example.

Working Example

Figure 1:
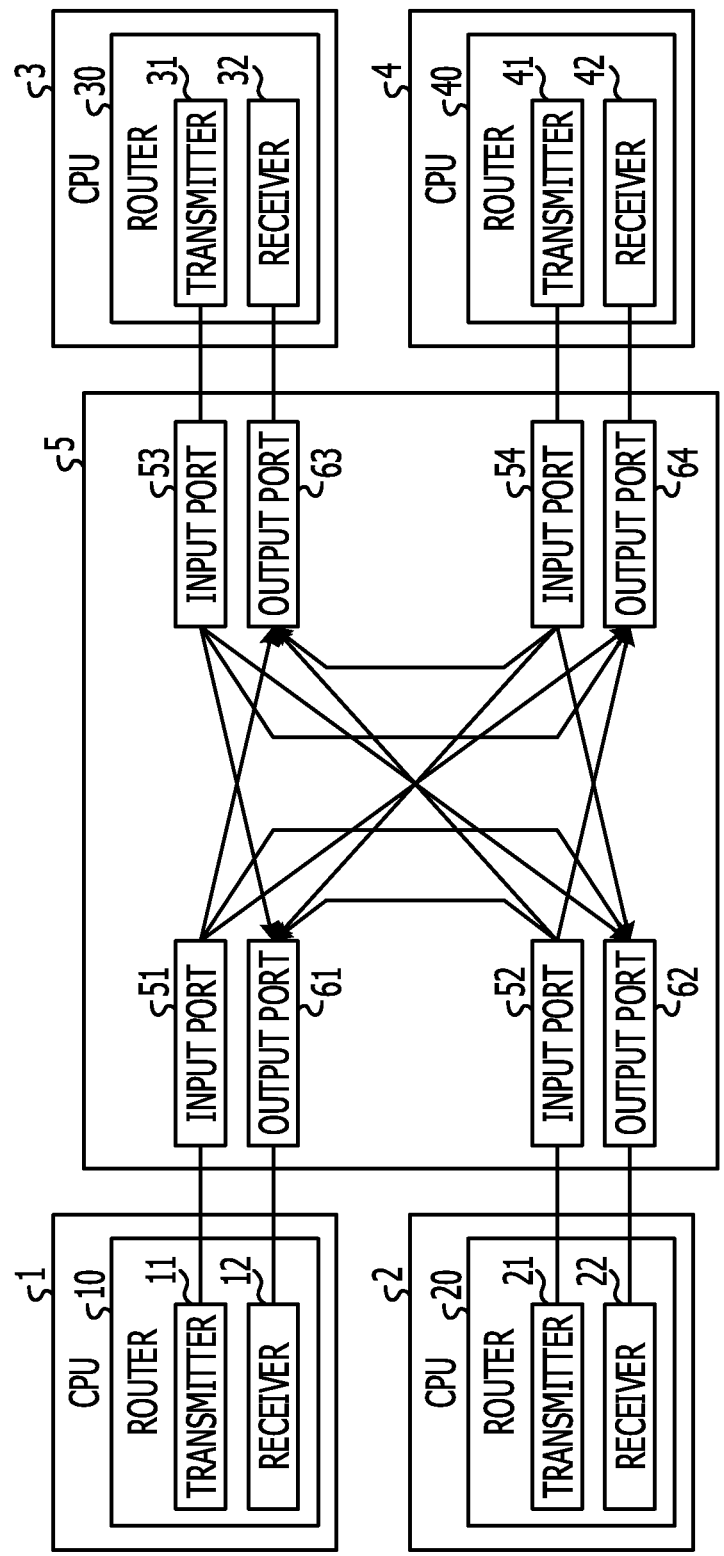
FIG. 1 is an example of a configuration diagram for a parallel computer according to the working example.

FIG. 1 is an example of a configuration diagram for a parallel computer according to the working example. As illustrated in FIG. 1, the parallel computer according to the working example includes CPUs 1 to 4 and a crossbar switch 5 connecting the CPUs. Although this working example describes using four CPUs herein, the number of CPUs provided in the parallel computer is not limited thereto, and may be less than four, or five or more. In this working example, the crossbar switch 5 includes four input ports and output ports to match the number of CPUs, but the number of ports is not limited thereto. The number of ports in the crossbar switch 5 may also differ from the number of CPUs.

The CPU 1 includes a router 10 that controls communication with the other CPUs. The router 10 includes a transmitter 11 and a receiver 12. The transmitter 11 transmits arbitration requests, or communication requests, to the crossbar switch 5, and also transmits data to the other CPUs. The receiver 12 receives communication authorization notifications from the crossbar switch 5, and also receives data transmitted from other CPUs.

Since the CPUs 2 to 4 have a similar configuration to the CPU 1, description is omitted.

The crossbar switch 5 includes input ports 51 to 54 and output ports 61 to 64. The input port 51 and the output port 61 are paired ports. Similarly, the input ports 52 to 54 are respectively paired with the output ports 62 to 64.

The input port 51 is able to connect to any of the output ports 62 to 64 besides the paired output port 61. Furthermore, the input port 51 is coupled to the transmitter 11 of the CPU 1. The input port 51 receives data and arbitration request input delivered from the transmitter 11 of the CPU 1. The input port 51 then transfers the data to the output port coupled to the destination CPU requested for communication in the arbitration request from among the output ports 62 to 64. The input port 51 receives a communication authorization notification, which is a response from an output port with respect to an arbitration request, and outputs the received communication authorization notification to the transmitter 11. In addition, the input port 51 transfers data received from the transmitter 11 to the output port coupled to the recipient CPU of the data delivered from the transmitter 11 from among the output ports 62 to 64.

Since the input ports 52 to 54 have similar functionality as the input port 51 and operate similarly, description is omitted. The input ports 51 to 54 will be later described in further detail.

The output port 61 is able to connect to any of the input ports 52 to 54 besides the paired input port 51. Furthermore, the output port 61 is coupled to the receiver 12 of the CPU 1. The output port 61 receives arbitration requests from the CPUs 2 to 4, and conducts arbitration to determine which CPU is authorized to transmit data. The output port 61 then outputs a communication authorization notification to the input port coupled to the CPU determined by arbitration. The output port 61 outputs data transmitted from the CPUs 2 to 4 to the receiver 12 of the CPU 1.

Since the output ports 62 to 64 have similar functionality as the output port 61 and operate similarly, description is omitted. The output ports 61 to 64 will be later described in further detail.

An idle state refers to the case where the output port 62 is not transferring data or receiving an arbitration request. The output port 62 is set to immediately transfer data from the CPU 1 without arbitration when receiving an arbitration request from the CPU 1 while in the idle state. In this way, the output port 62 and the CPU 1 are set as a paired group in which data transfer is prioritized. Hereinafter, the output port with respect to a CPU in such a group is designated a "master port". In other words, the output port 62 is set as the master port of the CPU 1. The output port 63 is set as the master port of the CPU 2. The output port 64 is set as the master port of the CPU 3. The output port 61 is set as the master port of the CPU 4.

Since the data size is large, the CPUs 1 to 4 are able to reserve only one route over which to transmit data in the case of transmitting data to another CPU among the CPUs 1 to 4. In other words, the CPUs 1 to 4 transmit data to any one CPU during a single data transmission. In contrast, since arbitration requests and the like are small in size, the CPUs 1 to 4 are able to reserve multiple routes for a single transmission. In other words, the CPUs 1 to 4 are able to simultaneously transmit arbitration requests to multiple CPUs.

Figure 2:
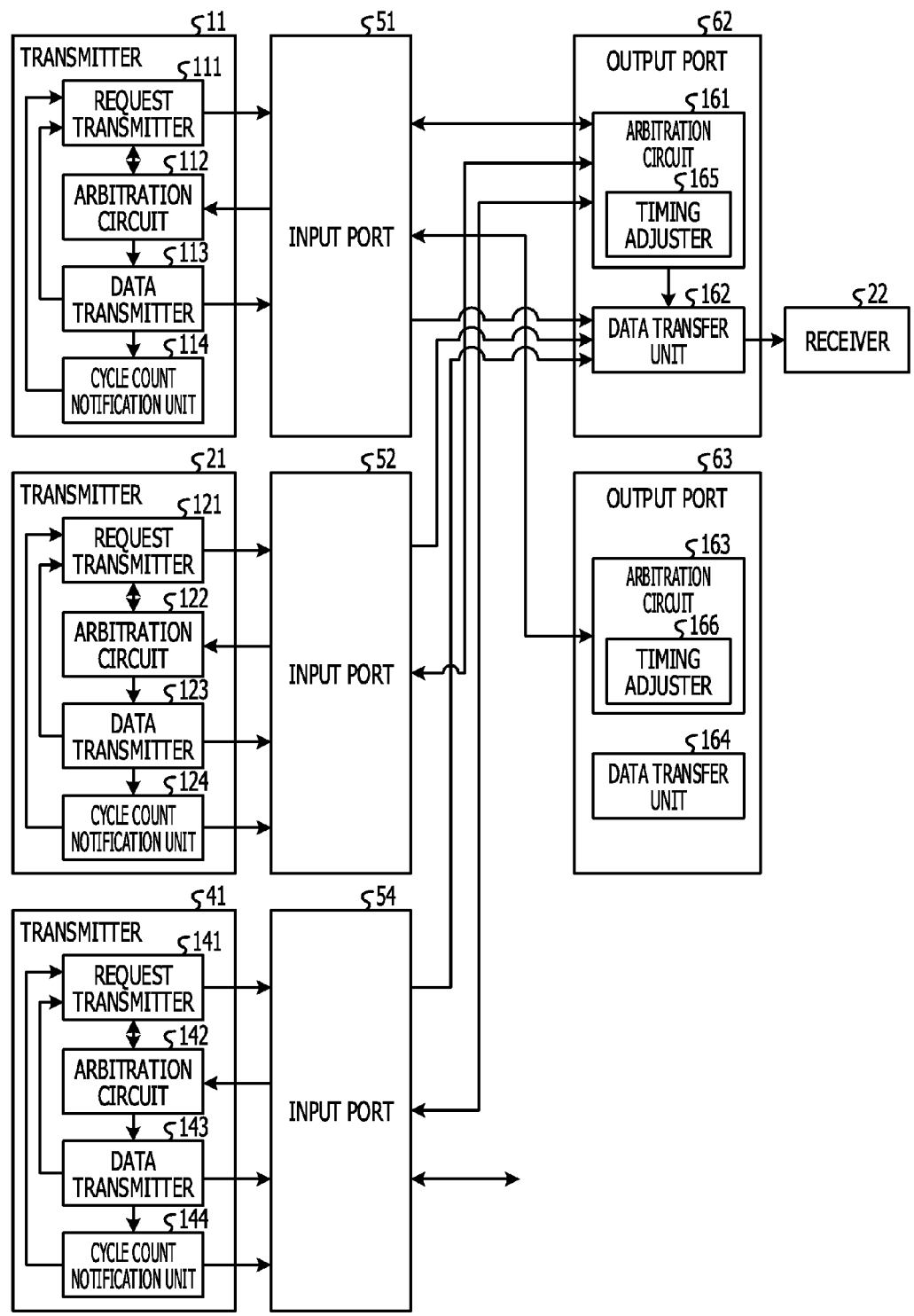
FIG. 2 is an example of a block diagram illustrating details of a parallel computer according to the working example.

Additionally, a parallel computer according to the working example will be described in further detail with reference to FIG. 2. FIG. 2 is an example of a block diagram illustrating details of a parallel computer according to the working example. Described herein is an example where the CPU 1 issues data transmission requests to the CPUs 2 and 3, while the CPUs 2 and 4 issue data transmission requests to the CPU 3. FIG. 2 depicts the transmitters, input ports, and output ports used in the description, and reduces or omits depiction of other parts.

The transmitter 11 includes a request transmitter 111, an arbitration circuit 112, and a data transmitter 113. The transmitter 21 includes a request transmitter 121, an arbitration circuit 122, and a data transmitter 123. The transmitter 41 includes a request transmitter 141, an arbitration circuit 142, and a data transmitter 143. Although the transmitter 31 is not illustrated in FIG. 2, the transmitter 31 has similar functionality.

The request transmitter 111 delivers an arbitration request to the input port 51 in the case where the CPU 1 transmits data to one of the other CPUs 2 to 4. Arbitration requests from the request transmitter 111 may also be transmitted to multiple CPUs simultaneously. Information on the CPU that is the data transmission recipient is added to the arbitration request.

Herein, the request transmitter 111 outputs to the input port 51 an arbitration request for data transmission to the CPU 2. The request transmitter 111 outputs to the input port 51 an arbitration request for data transmission to the CPU 3. After that, the arbitration circuit 112 continues to transmit arbitration requests to the same output port until the data transmitter 113 starts data transmission in response to the arbitration request from the output port on which the arbitration request was transmitted. Upon receiving from the data transmitter 113 a notification indicating that data transmission in response to the arbitration request has started, the request transmitter 111 stops transmitting that arbitration request.

Furthermore, the request transmitter 111 transmits information indicating that an arbitration request was transmitted to the arbitration circuit 112, together with information on the data recipient CPU specified by that arbitration request.

From the arbitration circuit 112 the request transmitter 111 receives the input of information on a CPU that the arbitration circuit 112 did not select as a recipient of the data from the current CPU from among the CPUs that replied with a communication authorization notification discussed later in response to an arbitration request. Hereinafter, an "unselected CPU" refers to a CPU from which the current CPU receives a communication authorization notification from an output port, but which is not selected as a recipient of data from the current CPU. For example, as discussed later, in the case where the arbitration circuit 112 selects the CPU 3 as the recipient of data from the current CPU, the request transmitter 111 receives from the arbitration circuit 112 the input of information on the CPU 2 as an unselected CPU.

From a cycle count notification unit 114, the request transmitter 111 receives a cycle count, which is the number of clock cycles until the current data transmission ends (that is, the standby time). Then, in the case of transmitting an arbitration request after receiving a cycle count but before that cycle count elapses, the request transmitter 111 transmits an arbitration request with added information on the cycle count. In the case of receiving information on an unselected CPU when a cycle count has been received, the request transmitter 111 adds the cycle count to the arbitration request and once again transmits an arbitration request to the output port coupled to the unselected CPU.

The request transmitter 121 outputs to the input port 52 an arbitration request for data transmission to the CPU 2. The request transmitter 141 outputs to the input port 54 an arbitration request for data transmission to the CPU 2.

In the case where the output port 62 is in an idle state and not transferring data, the arbitration circuit 112 continues to receive, from the input port 51, communication authorization notifications from the output port 62, or master port. In this state, if a notification about the transmission of an arbitration request for data transmission to the CPU 2 is received from the request transmitter 111, the arbitration circuit 112 instructs the data transmitter 113 to transmit data corresponding to the arbitration request transmitted by the request transmitter 111.

In the case where the output port 62 is not in an idle state, the arbitration circuit 112 receives, from the input port 51, a communication authorization notification delivered from the output port 62 as a response to the arbitration request from the request transmitter 111. Irrespective of whether the output port 62 is in an idle state or not, the arbitration circuit 112 receives, from the input port 51, communication authorization notifications delivered from the output ports 63 and 64 other than the master port in response to the arbitration requests. In the case of receiving multiple communication authorization notifications, the arbitration circuit 112 instructs the data transmitter 113 to transmit data to the CPU coupled to the output port that transmitted the communication authorization notification that was received first.

For example, the arbitration circuit 112 receives, from the input port 51, a communication authorization notification delivered from the output port 62. Next, the arbitration circuit 112 receives, from the input port 51, a communication authorization notification delivered from the output port 63. The arbitration circuit 112 then instructs the data transmitter 113 to transmit data to the CPU 2 corresponding to the communication authorization notification that was acquired first. In addition, the arbitration circuit 112 notifies the request transmitter 111 that arbitration requests to CPUs other than the CPU 2 to which to transmit data have not been selected. At this point, the arbitration circuit 112 notifies the request transmitter 111 that the arbitration request to the CPU 3 has not been selected, or in other words that the CPU 3 is an unselected CPU. The arbitration circuit 112 then discards all communication authorization notifications other than the communication authorization notification that was acquired first. Herein, the arbitration circuit 112 discards the communication authorization notification from the output port 63.

The arbitration circuit 122 of the transmitter 21 and the arbitration circuit 142 of the transmitter 41 operate similarly to the arbitration circuit 112. Herein, the arbitration circuit 122 of the transmitter 21 and the arbitration circuit 142 of the transmitter 41 do not acquire a communication authorization notification, since the output port 63 does not select the CPU 1 by arbitration as the CPU authorized for data transmission.

The data transmitter 113 receives, from the arbitration circuit 112, instructions to transmit data to a CPU selected as a data recipient. The data transmitter 113 then transmits data to the specified CPU. In addition, the data transmitter 113 informs the cycle count notification unit 114 of the data length of the data being transmitted.

For example, the data transmitter 113 receives instructions to transmit data to the CPU 2 from the arbitration circuit 112. The data transmitter 113 then transmits data addressed to the CPU 2 to the input port 51. In addition, the data transmitter 113 informs the cycle count notification unit 114 of the data length of the data to transmit to the CPU 2.

Upon starting data transmission, the data transmitter 113 notifies the request transmitter 111 of this fact.

The cycle count notification unit 114 receives, from the data transmitter 113, a notification about the data length of the data being transmitted. From the received data length, the cycle count notification unit 114 computes a cycle count, which is the number of clock cycles until the data transmission will finish. For example, the cycle count notification unit 114 receives, from the data transmitter 113, the data length of the data to transmit to the CPU 2. From the data length of the data to transmit to the CPU 2, the cycle count notification unit 114 computes a cycle count, which is the number of clock cycles until the data transmission to the CPU 2 will finish. In this working example, a cycle count is calculated from a data length, but other methods are also acceptable insofar as the time until data transmission ends is computed. For example, a cycle count until processing finishes may be computed from types of processing that execute reads and writes.

Next, the cycle count notification unit 114 transmits the computed cycle count to the request transmitter 111.

The input port 51 receives, from the request transmitter 111, an arbitration request for a data recipient CPU. The input port 51 then transmits the received arbitration request to the output port coupled to the data recipient CPU.

For example, the input port 51 receives, from the request transmitter 111, an arbitration request for data transmission to the CPU 3. The input port 51 then transmits an arbitration request to the output port 63 coupled to the CPU 3. Next, the input port 51 receives, from the request transmitter 111, an arbitration request for data transmission to the CPU 2. The input port 51 then transmits an arbitration request to the output port 62 coupled to the CPU 2.

In the case where the output port 62 is in an idle state and not transferring data, the input port 51 continues to receive communication authorization notifications from the arbitration circuit 161 of the output port 62. The input port 51 then transmits a communication authorization notification from the arbitration circuit 161 to the arbitration circuit 112.

In contrast, in the case where the output port 62 is not in an idle state in which data is not being transferred, the input port 51 conducts the following operations with respect to the other output ports 63 and 64. In the case where data transmission is authorized on an output port that transmitted an arbitration request, the input port 51 receives a communication authorization notification from the output port that transmitted that arbitration request. For example, the input port 51 receives a communication authorization notification from the arbitration circuit 161 of the output port 62. The input port 51 then transmits the communication authorization notification from the arbitration circuit 161 to the arbitration circuit 112. The input port 51 receives a communication authorization notification from the arbitration circuit 163 of the output port 63. The input port 51 then transmits the communication authorization notification from the arbitration circuit 163 to the arbitration circuit 112.

Furthermore, the input port 51 receives, from the data transmitter 113, data addressed to another CPU in response to arbitration requests that received a communication authorization notification. The input port 51 then transmits the received data to the output port coupled to the data recipient CPU. For example, the input port 51 receives, from the data transmitter 113, data addressed to the CPU 2. The input port 51 then transmits the data addressed to the CPU 2 to a data transfer unit 162 of the output port 62.

The output port 62 includes an arbitration circuit 161 and a data transfer unit 162. The output port 63 similarly includes an arbitration circuit 163 and a data transfer unit 164. In addition, the arbitration circuits 161 and 163 include timing adjusters 165 and 166, respectively.

In the case where the output port 62 is not in an idle state, the arbitration circuit 161 receives arbitration requests for data transmission requests addressed to the CPU 2 from the input ports 51, 53, and 54. In the case of multiple arbitration requests, the arbitration circuit 161 uses predetermined conditions to select the highest-priority CPU from among the CPUs that have transmitted an arbitration request. For example, the arbitration circuit 161 stores a priority ranking for the CPUs 1, 3, and 4 in advance. The arbitration circuit 161 then selects the CPU ranked highest in the stored priority ranking from among the CPUs that have transmitted an arbitration request. Otherwise, the arbitration circuit 161 is able to select the highest-ranked CPU while changing the priority ranking of CPUs, such as lowering the priority ranking of a CPU that has been selected once, for example.

The arbitration circuit 161 transmits a communication authorization notification to the input port coupled to the selected CPU. For example, in the case of selecting the CPU 1, the arbitration circuit 161 transmits a communication authorization notification to the input port 51.

In the case where the output port 62 is in an idle state, the arbitration circuit 161 continually transmits a communication authorization notification for the CPU 1 to the input port 51. If an arbitration request is received from the CPU 1 at this time, the arbitration circuit 161 instructs the data transfer unit 162 to immediately transfer data from the CPU 1 to the CPU 2. Meanwhile, if an arbitration request is received from a CPU other than the CPU 1, the output port 62 stops transmitting a transmit authorization notification for the CPU 1. Additionally, in the case of receiving multiple arbitration requests, the arbitration circuit 161 conducts arbitration, and determines the CPU authorized for data transmission. After that, the arbitration circuit 161 transmits a transmit authorization notification for the determined CPU to the input port coupled to that CPU. In contrast, if only one arbitration request is received, the arbitration circuit 161 transmits a transmit authorization notification for the CPU that transmitted that arbitration request to the input port coupled to that CPU.

For example, in the case where the arbitration circuit 161 is in an idle state and receives arbitration requests from the CPUs 1, 3, and 4, the arbitration circuit 161 determines its master port pair, the CPU 1, as the CPU authorized for data transmission. In this case, the CPUs 3 and 4 are not selected as the CPU authorized for data transmission.

For example, in the case where the arbitration circuit 161 is not in an idle state and receives arbitration requests from the CPUs 1, 3, and 4, the arbitration circuit 161 conducts arbitration and determines the CPU authorized for data transmission.

Arbitration is similarly conducted at the other output ports, a CPU authorized for data transmission is selected, and a communication authorization notification addressed to that CPU is transmitted to the input port coupled to that CPU. For example, communication authorizations from different output ports may be transmitted in some cases.

The arbitration circuit 163 of the output port 63 receives an arbitration request from the CPU 1, for example. The arbitration circuit 163 then selects the CPU 1 as the CPU authorized for data transmission. The arbitration circuit 163 then transmits a communication authorization notification for the CPU 1 to the input port 51. However, in this case, although a communication authorization notification from the arbitration circuit 163 is transmitted to the arbitration circuit 112 of the CPU 1, since the output port 62 transmitted a communication authorization notification to the CPU 1 sooner, the CPU 3 is not selected as a recipient for data transmission.

After that, a transmit authorization notification is transmitted to the CPU 1, while the arbitration circuit 163 of the output port 63 coupled to the CPU that was not selected as a data recipient receives from the request transmitter 111 of that CPU 1 an arbitration request with an added cycle count.

Then, in the case of receiving an arbitration request with an added cycle count, the arbitration circuit 163 causes the request transmitter 111 outputting a transmit authorization notification to stop transmitting a transmit authorization notification. The arbitration circuit 163 then selects its master port pair, the CPU 2, as the port authorized for data transmission, and transmits a communication authorization notification.

After that, the arbitration circuit 163 transfers data from the CPU 2 upon receiving an arbitration request from its master port pair, the CPU 2. Meanwhile, in the case of receiving an arbitration request from the CPU 3 or 4 and not the master port pair CPU 2, the timing adjuster 165 counts while decrementing the cycle count one at a time. When the cycle count subsequently reaches 0, or in other words when the time corresponding to the cycle count elapses, the timing adjuster 165 informs the arbitration circuit 163 that the cycle count time has elapsed. Upon being informed by the timing adjuster 165 that the cycle count time has elapsed, the arbitration circuit 163 conducts arbitration among the CPUs that have transmitted arbitration requests, and selects a CPU authorized for data transmission.

If no arbitration requests arrive, upon being information by the timing adjuster 165 that the cycle count time has elapsed, the arbitration circuit 163 selects the CPU 1 that transmitted the arbitration request with the added cycle count as the CPU authorized for data transmission. The arbitration circuit 163 then transmits a communication authorization notification to the selected CPU 1.

In the case of receiving a cycle count from another CPU after already having received a cycle count from a CPU, the timing adjuster 165 selects the cycle count with the shorter remaining time, or in other words the cycle count whose data transmission will complete sooner. The timing adjuster 165 counts the selected cycle count, and when the time corresponding to the selected cycle count elapses, the timing adjuster 165 informs the arbitration circuit 163 that the cycle count time has elapsed. Upon being informed by the timing adjuster 165 that the cycle count time has elapsed, the arbitration circuit 163 conducts arbitration among the CPUs that have transmitted arbitration requests, and selects a CPU authorized for data transmission. The arbitration circuit 163 then transmits a communication authorization notification to the selected CPU 1.

As an example, a case will be described in which the output port 63 has transmitted a communication authorization notification to the CPU 1, but the CPU 1 has selected the CPU 2 as a data recipient CPU. The arbitration circuit 163 once again receives, from the request transmitter 111 via the input port 51, an arbitration request with an added cycle count until the CPU 1 will finish data transmission to the CPU 2. The arbitration circuit 163 then stops transmitting a communication authorization notification to the CPU 1. In addition, the arbitration circuit 163 selects its master port pair, the CPU 2, as the CPU authorized for data transmission. The timing adjuster 165 then counts by decrementing the cycle count one at a time. If no arbitration request arrives from a CPU during this time, the arbitration circuit 163 once again transmits a communication authorization notification to the CPU 1 upon being informed by the timing adjuster 165 when the count reaches 0. If, during the count, an arbitration request is received from another CPU such as the CPU 4, for example, the arbitration circuit 163 conducts arbitration between the CPU 4 and the CPU 1 upon being informed by the timing adjuster 165. The arbitration circuit 163 then selects the CPU 4 or the CPU 1 as the CPU authorized for data transmission, and transmits a communication authorization notification to the selected CPU.

In the case where the transmitter 11 transmits data to the CPU 2, the data transfer unit 162 receives, from the input port 51, data transmitted by the data transmitter 113 of the transmitter 11. The data transfer unit 162 then transmits the received data to the receiver 22 of the CPU 2.

In the case where the transmitter 11 transmits data to the CPU 2, the receiver 22 receives, from the data transfer unit 162, data transmitted by the transmitter 11. The CPU 2 conducts processing using the data received by the receiver 22.

Figure 3:
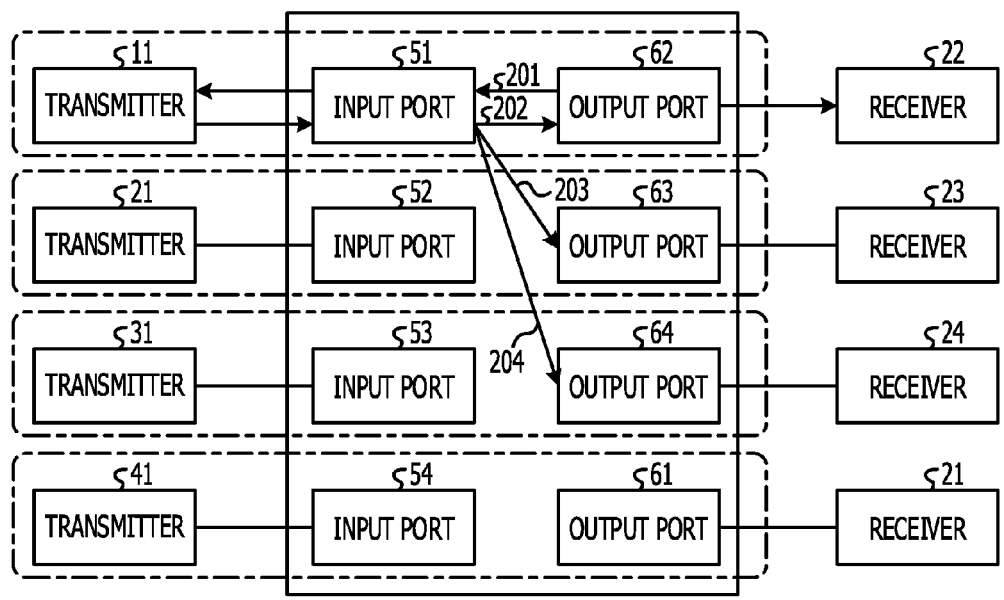
FIG. 3 is an example of a diagram illustrating a state at the stage where arbitration requests are transmitted.
Figure 4:
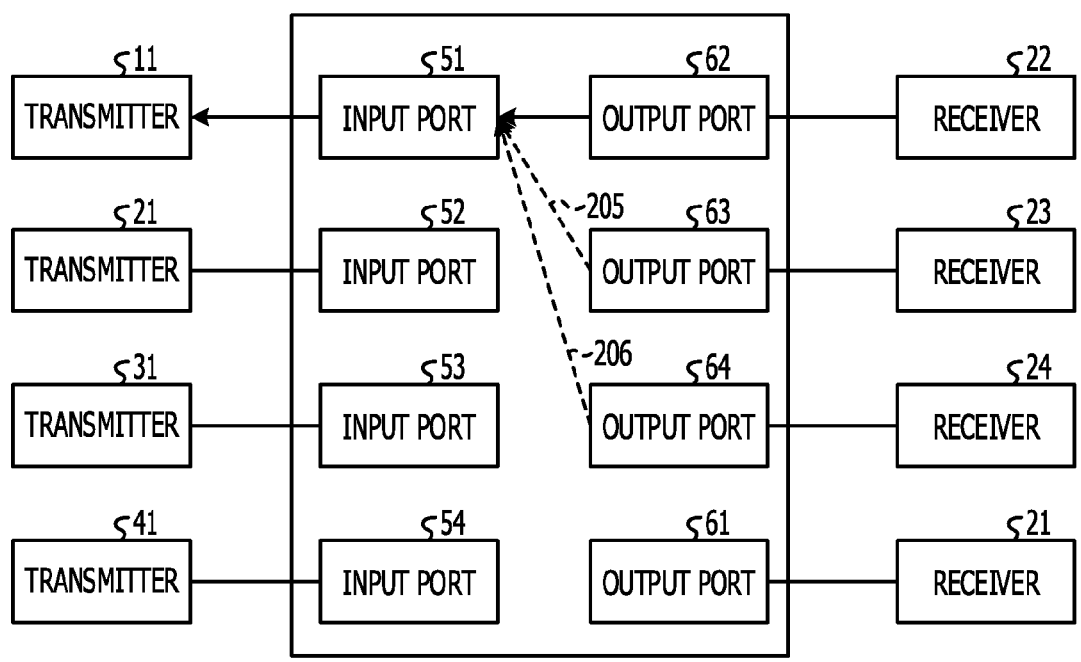
FIG. 4 is an example of a diagram illustrating a state at the stage where communication authorization notifications are transmitted.
Figure 5:
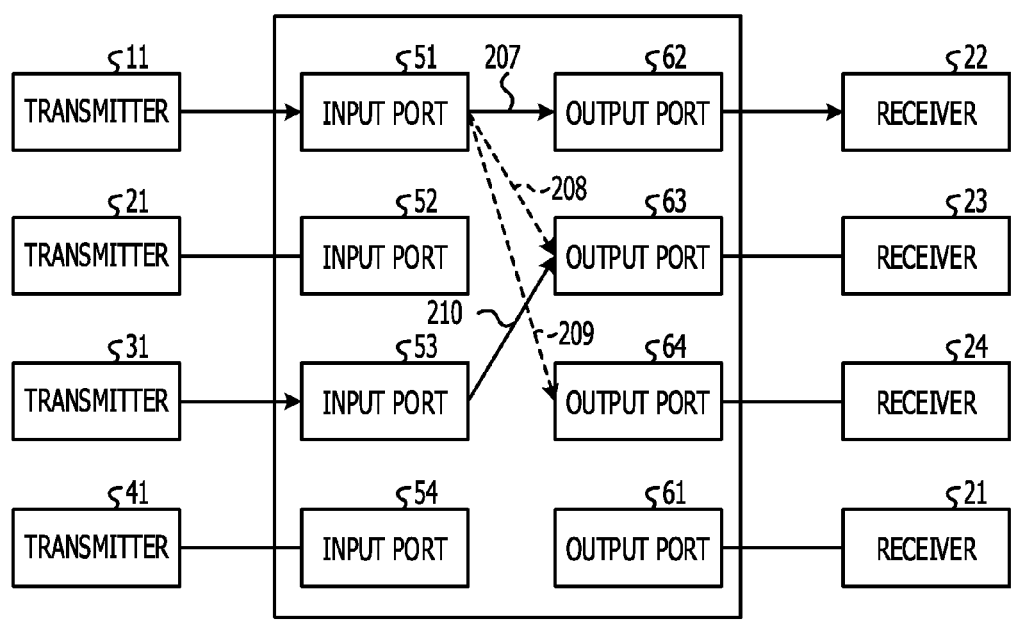
FIG. 5 is an example of a diagram illustrating a state at the stage where data and cycle counts are transmitted.
Figure 6:
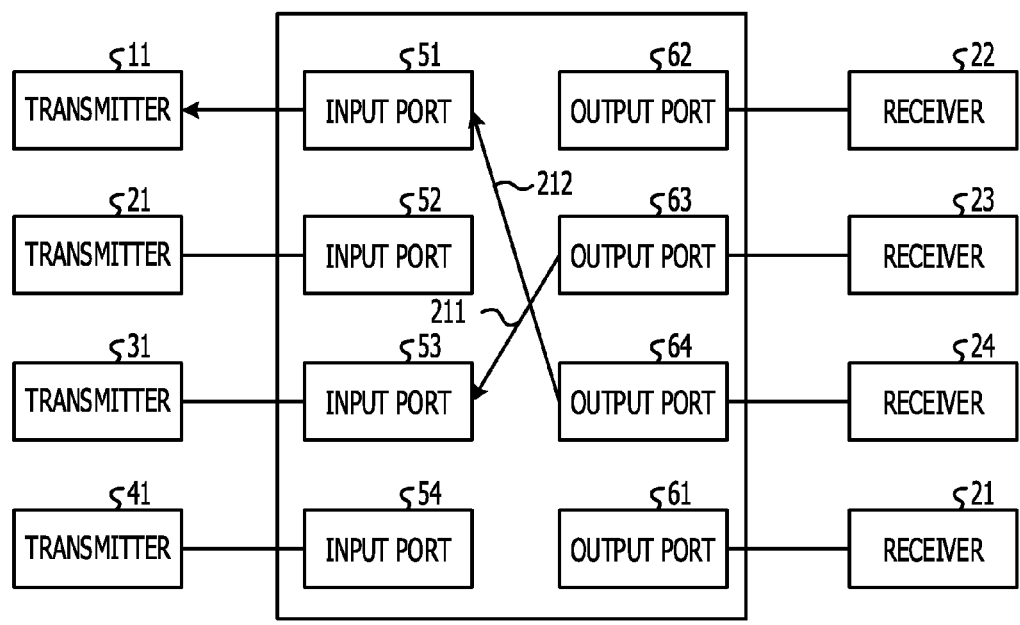
FIG. 6 is an example of a diagram illustrating a state at the stage where re-arbitration is conducted and arbitration requests are transmitted.
Figure 7:
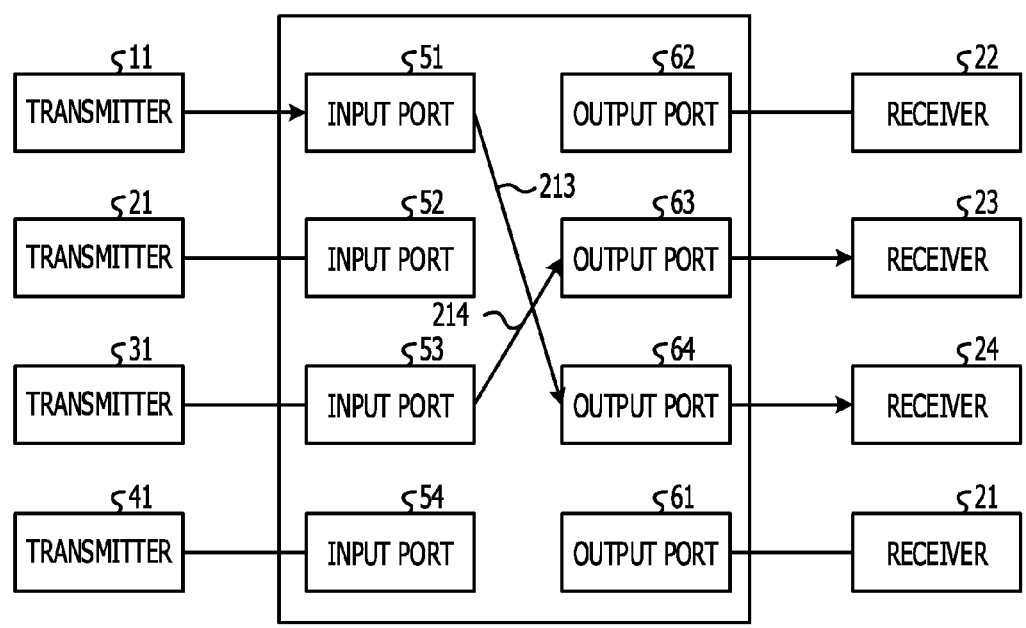
FIG. 7 is an example of a diagram illustrating a state at the stage where data and cycle counts are transmitted after re-arbitration.

Next, the overall flow of data transmission request arbitration according to the working example will be described with reference to FIGS. 3 to 7. FIG. 3 is an example of a diagram illustrating a state at the stage where arbitration requests are transmitted. FIG. 4 is an example of a diagram illustrating a state at the stage where communication authorization notifications are transmitted. FIG. 5 is an example of a diagram illustrating a state at the stage where data and cycle counts are transmitted. FIG. 6 is an example of a diagram illustrating a state at the stage where re-arbitration is conducted and arbitration requests are transmitted. FIG. 7 is an example of a diagram illustrating a state at the stage where data and cycle counts are transmitted after re-arbitration. Since the signals from each transmitter are transmitted via a corresponding input port to an output port, and the signals from the output ports are transmitted via an input port corresponding to each transmitter, signals between a transmitter and an output port will be described as signals between an input port and an output port.

The pairs of a transmitter and an output port enclosed by chain lines in FIG. 3 represent master port pairs. For example, the output port 62 is the master port of the transmitter 11. In this case, the output port 62 is in an idle state and not conducting data transmission or arbitration. Thus, the output port 62 continually transmits a transmit authorization notification 201 to the transmitter 11. As illustrated in FIG. 3, the transmitter 11 transmits arbitration requests 202 to 204 to the output ports 62 to 64.

The output ports 62 to 64 receive these arbitration requests 202 to 204 and conduct arbitration. Herein, since the output ports 62 to 64 each has only received an arbitration request from the transmitter 11, the output ports 62 to 64 respectively select the CPU 1 that includes the transmitter 11 as the CPU authorized for data transmission.

Herein, the output port 62 is the master port, and upon receiving an arbitration request from the transmitter 11, immediately enters a state enabling data transfer. The transmitter 11 starts transmitting data to the CPU 2 that includes the receiver 22 immediately after outputting the arbitration request. Meanwhile, the output ports 63 and 64 each transmit a transmit authorization notification to the transmitter 11, as illustrated in FIG. 4. However, the transmitter 11 has selected the CPU 2 that includes the receiver 22 coupled to the output port 62 which is the master port, and thus the transmitter 11 does not select the communication authorization notifications from the output ports 63 and 64.

Next, as illustrated in FIG. 5, the transmitter 11 transmits data 207 for the receiver 22 to the output port 62. In addition, the transmitter 11 computes the cycle count until the transmission of the data 207 will complete, and transmits arbitration requests 208 and 209 loaded with the computed cycle count to the output ports 63 and 64. The output ports 63 and 64 stop transmitting communication authorization notifications to the transmitter 11, and start counting the cycle count. At this point, assume that the transmitter 31 sends an arbitration request 210 to the output port 63.

Then, after the cycle count elapses, the output port 63 conducts arbitration on the basis of the arbitration requests from the transmitter 11 and the transmitter 31. Herein, assume that the output port 63 selects the CPU 3 that includes the transmitter 31. In this case, the output port 63 sends a communication authorization notification 211 to the transmitter 31, as illustrated in FIG. 6. Meanwhile, since the output port 64 has not received another arbitration request, the output port 64 selects the CPU 1 that includes the transmitter 11. The output port 64 then sends a communication authorization notification 212 to the transmitter 11, as illustrated in FIG. 6.

After that, as illustrated in FIG. 7, the transmitter 11 transmits data 213 for the receiver 24 to the output port 64. The transmitter 31 transmits data 214 for the receiver 23 to the output port 63.

Figure 8:
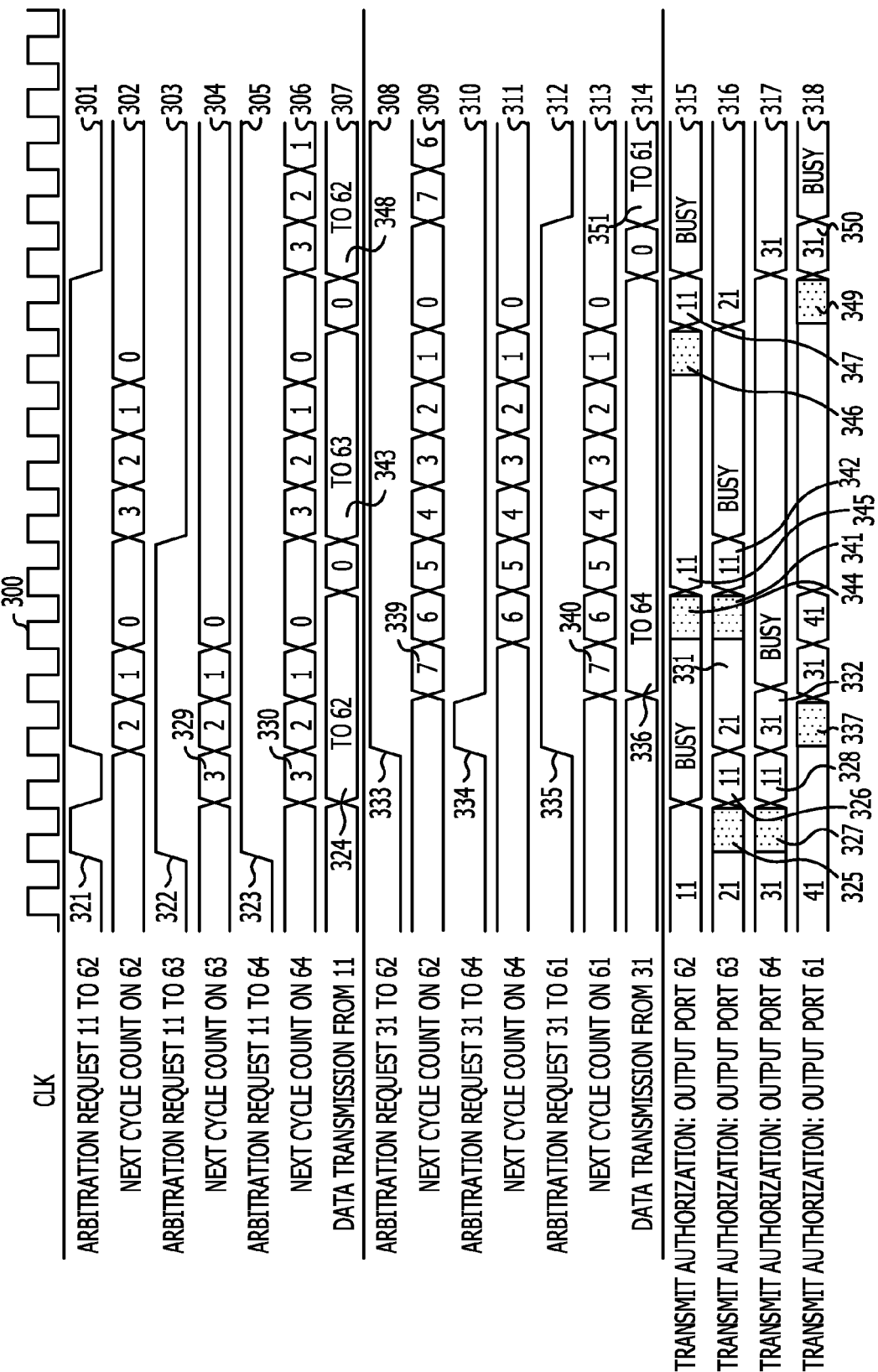
FIG. 8 is an example of a timing chart for a data transmission process conducted by a parallel computer according to the working example.

Next, the flow of a data transmission processing sequence conducted by a parallel computer according to the working example will be described with reference to FIG. 8. FIG. 8 is an example of a timing chart for a data transmission process conducted by a parallel computer according to the working example.

The graph 300 illustrates operational clocks of a parallel computer. The arbitration requests on the left side of the graphs 301 to 312 indicate that the graphs are arbitration request transmission graphs, while the numbers following the arbitration requests indicate from which transmitter and to which output port each arbitration request is transmitted. Herein, a high arbitration request indicates that an arbitration request is being sent, while a low arbitration request indicates that an arbitration request is not being sent. The next cycle counts indicate graphs of changes in the cycle count until the next arbitration may be started. Also, the numbers following the next cycle counts indicate the corresponding output port.

Specifically, the graph 301 indicates the transmission of an arbitration request from the transmitter 11 to the output port 62. The graph 302 indicates changes in the cycle count until the next arbitration may be started on the output port 62 in accordance with the data transmission from the transmitter 11. The graph 303 indicates the transmission of an arbitration request from the transmitter 11 to the output port 63. The graph 304 indicates changes in the cycle count until the next arbitration may be started on the output port 63 in accordance with the data transmission from the transmitter 11. The graph 305 indicates the transmission of an arbitration request from the transmitter 11 to the output port 64. The graph 306 indicates changes in the cycle count until the next arbitration may be started on the output port 64 in accordance with the data transmission from the transmitter 11.

The graph 307 indicates data transmission from the transmitter 11. The numbers after "to" in the graph 307 indicate the signs of output ports to which data is transmitted. For example, "to 62" indicates that data is being transmitted to the output port 62. Additionally, "0" in graph 307 indicates that data is not being transmitted.

The graph 308 indicates the transmission of an arbitration request from the transmitter 31 to the output port 62. The graph 309 indicates changes in the cycle count until the next arbitration may be started on the output port 62 in accordance with the data transmission from the transmitter 31. The graph 310 indicates the transmission of an arbitration request from the transmitter 31 to the output port 64. The graph 311 indicates changes in the cycle count until the next arbitration may be started on the output port 64 in accordance with the data transmission from the transmitter 11. The graph 312 indicates the transmission of an arbitration request from the transmitter 31 to the output port 61. The graph 313 indicates changes in the cycle count until the next arbitration may be started on the output port 61 in accordance with the data transmission from the transmitter 31.

The graph 314 indicates data transmission from the transmitter 31. The numbers after "to" in the graph 314 indicate the signs of output ports to which data is transmitted. Additionally, "0" in graph 314 indicates that data is not being transmitted.

The graph 315 indicates the recipient of a communication authorization notification from the output port 62. The graph 316 indicates the recipient of a communication authorization notification from the output port 63. The graph 317 indicates the recipient of a communication authorization notification from the output port 64. The graph 318 indicates the recipient of a communication authorization notification from the output port 61. In addition, the numbers in the graphs 315 to 318 indicate the signs of transmitters to which a communication authorization notification is transmitted. Also, the label "busy" in the graphs 315 to 318 indicates that data is being transferred.

As indicated in the graphs 315 to 318, the output ports 62 to 64 first respectively output transmit authorizations to their master ports, the transmitters 11 to 41.

As indicated in the graphs 301, 303, and 305, the transmitter 11 transmit arbitration requests to the output ports 62, 63, and 64 at the same timings 321, 322, and 323.

At this point, since the output port 62 is the master port of the transmitter 11, the transmitter 11 immediately selects the output port 62 as the data recipient, and as indicated in the graph 307, starts transmitting data to the output port 62 at the timing 324. Meanwhile, at the timing 325 in graph 316, the output port 63 conducts arbitration and determines to authorize data transmission from the transmitter 11. Then, at the timing 326, the output port 63 transmits a communication authorization notification to the transmitter 11. At the timing 327 in graph 317, the output port 64 conducts arbitration and determines to authorize data transmission from the transmitter 11. Then, at the timing 328, the output port 64 transmits a communication authorization notification to the transmitter 11.

The transmitter 11, receiving the communication authorization, computes the cycle count until the data transmission to the output port 62 will complete. The transmitter 11 then notifies the output ports 63 and 64 of the computed cycle count, and the output ports 63 and 64 count the cycle count until the next arbitration. Herein, as indicated by the timings 329 and 330, the output ports 63 and 64 will conduct the next arbitration after three cycles. The output ports 63 and 64 count down the cycles.

The output port 63 receives an arbitration request with an added cycle count from the transmitter 11, and at the timing 331 in graph 316, stops the transmit authorization notification to the transmitter 11, and starts transmitting a transmit authorization notification to its master port pair, the transmitter 21. Similarly, at the timing 332 in graph 317, the output port 64 stops the transmit authorization notification to the transmitter 11, and starts transmitting a transmit authorization notification to its master port pair, the transmitter 31.

Additionally, while the output ports 63 and 64 are counting the cycle count until the data transfer by the transmitter 11 completes, as indicated in the graphs 308, 310, and 312, the transmitter 31 transmits arbitration requests to the output ports 62, 64, and 61 at the same timings 333, 334, and 335. At this point, since the output port 64 is the master port of the transmitter 31, the transmitter 31 immediately selects the output port 64 as the data recipient, and as indicated in the graph 314, starts transmitting data to the output port 64 at the timing 336. Meanwhile, at the timing 337 in graph 318, the output port 61 conducts arbitration and determines to authorize data transmission from the transmitter 31.

The transmitter 31, receiving the communication authorization from the output port 61, computes the cycle count until the data transmission to the output port 64 will complete. The transmitter 31 then notifies the output ports 61 and 62 of the computed cycle count, and the output ports 61 and 62 count the cycle count until the next arbitration. Herein, as indicated by the timings 339 and 340, the output ports 62 and 61 conduct the next arbitration after seven cycles. The output ports 61 and 62 count down the cycles.

The output port 63 receives an arbitration request with an added cycle count from the transmitter 31, and at the timing 331 in graph 316, stops the transmit authorization notification to the transmitter 11, and starts transmitting a transmit authorization notification to its master port pair, the transmitter 41.

After counting down three cycles, the output port 63 conducts arbitration at the timing 341 in graph 316. At this point, since the output port 63 has received an arbitration request from the transmitter 11 only, the output port 63 transmits a transmit authorization to the transmitter 11 at the timing 342. The transmitter 11, receiving the transmit authorization, transmits data to the output port 63 at the timing 343 in graph 307. Meanwhile, at the timing 344, the output port 62 also conducts arbitration, and selects the transmitter 11 as the target authorized for data transmission. However, in this case, the output port 63 has already transmitted a communication authorization notification to the transmitter 11. For this reason, although the output port 62 outputs a communication authorization notification to the transmitter 11 at the timing 345 in graph 315, the output port 62 once again receives an arbitration with an added cycle count from the transmitter 11. In this case, since the output port 62 is the master port of the transmitter 11, the output port 62 does not stop the transmission of a communication authorization notification due to again receiving an arbitration, but continues to transmit a communication authorization notification to the transmitter 11. Then, at the timing 346 in graph 315, the cycle count for the data transmission of the transmitter 11 elapses, and thus the output port 62 conducts arbitration, selects the transmitter 11, and transmits a communication authorization notification to the transmitter 11 at the timing 347. The transmitter 11, receiving the communication authorization notification, starts transmitting data to the output port 62 at the timing 348 in graph 307.

At the timing 349 in graph 318, the cycle count for the data transmission of the transmitter 31 elapses, and thus the output port 61 conducts arbitration. The output port 61 then transmits a communication authorization notification to the transmitter 31 at the timing 350. The transmitter 31, receiving the communication authorization notification, starts transmitting data to the output port 61 at the timing 351 in graph 314.

Figure 9:
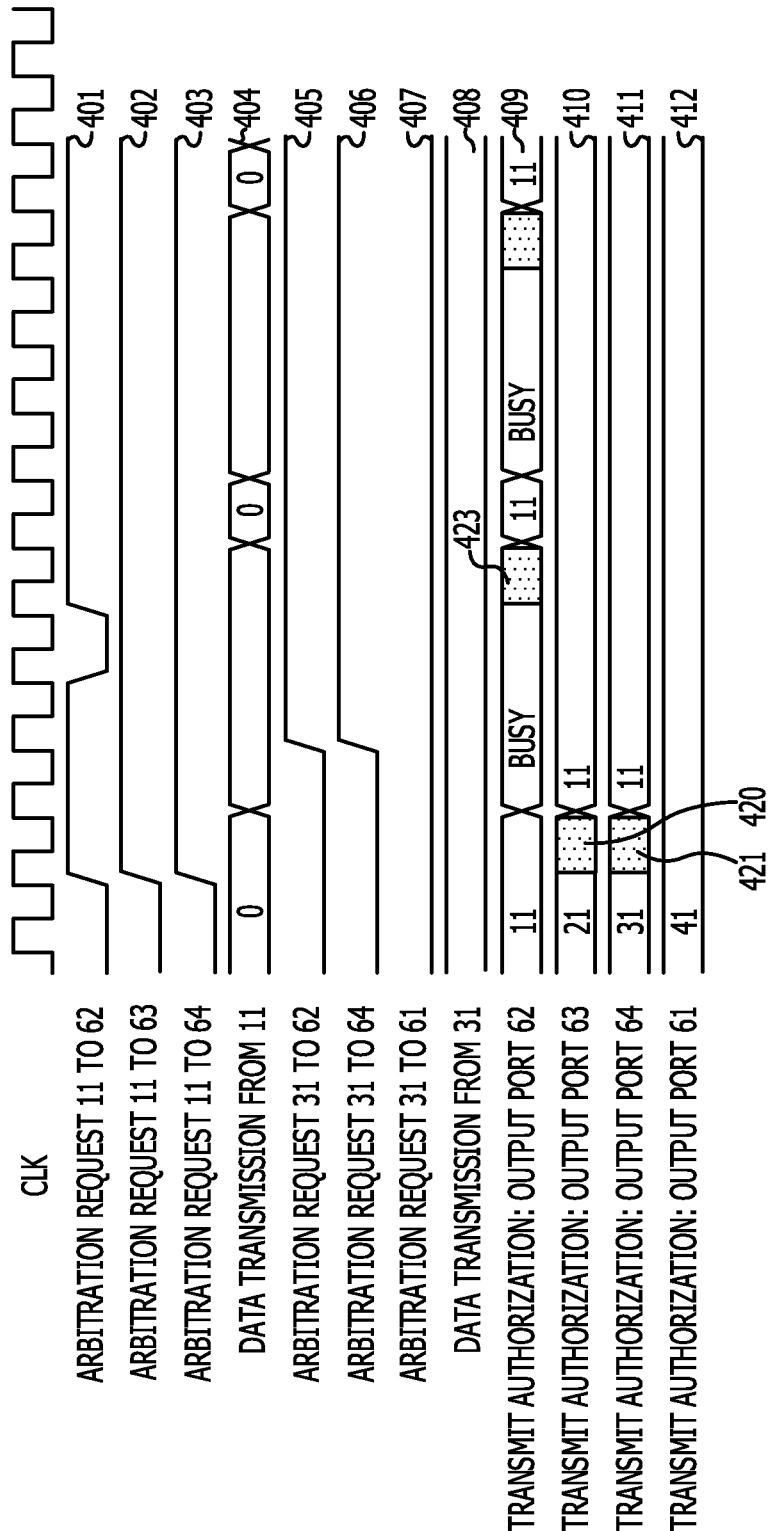
FIG. 9 is an example of a timing chart for a data transmission process conducted by a parallel computer according to the related art.

In contrast, FIG. 9 is a timing chart for a data transmission process conducted by a parallel computer according to the related art. The graphs 401 to 403 indicate the transmission of arbitration requests from the transmitter 11 to respective output ports. The graph 404 indicates data transmission from the transmitter 11. The graphs 405 to 407 indicate the transmission of arbitration requests from the transmitter 31 to respective output ports. The graph 408 indicates data transmission from the transmitter 31. Additionally, the graphs 409 to 412 indicate the recipients of transmit authorization notifications and data transfer from the output ports 61 to 64.

Likewise in this case, the transmitter 11 transmits arbitration requests to the output ports 62 to 64, as indicated in graphs 401 to 403. Since the output port 62 is the master port of the transmitter 11, the transmitter 11 immediately selects the output port 62 as the data recipient and starts transmitting data, as indicated in graphs 404 and 409. At this point, the output ports 63 and 64 each receive an arbitration request from the transmitter 11, and conduct arbitration at the timings 420 and 421 in graphs 410 and 411. The output ports 63 and 64 then each transmit a communication authorization notification to the transmitter 11. After that, the transmitter 31 transmits arbitration requests to the output ports 62 and 64, as indicated in graphs 405 and 406. However, since the output port 62 is transferring data, and the output port 64 is transmitting a communication authorization notification to the transmitter 31, the transmitter 31 obtains a communication authorization notification from neither of the output ports 62 and 64. After that, the output port data transmission ends at the timing 423 in graph 409, and although the output port 62 starts arbitration, at this point the output port 62 may again transmit a communication authorization notification to the transmitter 11 in some cases. As a result, there is a risk that data transfer may become unavailable to the output ports 63 and 64 for long periods of time, as indicated in graphs 410 and 411.

In this way, in the related art, a CPU that is transmitting data is selected as illustrated in FIG. 9, data transfer may become unavailable for long periods of time on some output ports. In contrast, a parallel computer according to the working example is able to avoid repeatedly selecting a master port, and reduce the incidence of output ports for which data transfer becomes unavailable for long periods of time, as illustrated in FIG. 8.

As described in the foregoing, in a parallel computer system according to the working example, in the case where data transmission is unavailable even though a communication authorization notification is received, there is reported a cycle count indicating how long until the data transmission in progress will complete. An output port that receives the reported cycle count then conducts arbitration again after that cycle count. In other words, since an output port conducts arbitration in accordance with a specified arbitration start cycle, it is possible to reduce the early arrival of a communication authorization notification from a master port, and keep the master ports from monopolizing the bus. In the case of receiving an arbitration request from a CPU in a master port pair while counting a cycle count, the parallel computer system transmits a communication authorization notification to that CPU. The parallel computer system is able to conduct arbitration to match the CPU with the lowest cycle count until data transmission completes. For this reason, even in the case where a transmit authorization notification is transmitted to a CPU that is transmitting data, the parallel computer system is able to invalidate that transmit authorization notification and transmit a transmit authorization notification to another CPU. Due to the above, the parallel computer system is able to efficiently conduct data transfers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A parallel computer system, comprising:
a plurality of processors including a first processor and a plurality of second processors; and
a crossbar switch coupled to the plurality of processors via a plurality of ports of the crossbar switch,
wherein the first processor is configured to:
transmit an arbitration request for requesting receipt of data to a first port and a second port among the plurality of ports,
transmit the data to the first port, when the first port is a master port which is set to preferentially receive data from the first processor without arbitration when receiving the arbitration request from the first processor while in an idle state, calculate a standby time corresponding to a time until transmission of the data to the first port will complete, transfer the calculated standby time to the second port, receive a communication authorization notification to authorize the arbitration request from the second port after the calculated standby time elapses, and transfer another data to one of the plurality of second processors via the second port in response to the communication authorization notification.

2. The parallel computer system according to claim 1, wherein the first processor is configured to:

transmit the arbitration request to a third port different from the first port and the second port from among the plurality of ports, and in the case of receiving a transmit authorization from the third port, transmit the data to the third port.

3. The parallel computer system according to claim 1, wherein the plurality of second processors include a third processor pair and a plurality of fourth processors, and the plurality of ports are configured to:

reply with a transmit authorization to the third processor pair in the case of receiving arbitration requests from the third processor pair while in the idle state, and reply with a transmit authorization to a processor selected from among the plurality of fourth processors in the case of receiving arbitration requests from the plurality of fourth processors.

4. The parallel computer system according to claim 1, wherein each of the plurality of ports transfers data received from a processor selected from among the plurality of second processors.

5. The parallel computer system according to claim 1, wherein the first processor computes the standby time based on a length of the data.

6. The parallel computer system according to claim 1, wherein the standby time is a number of clock cycles until the transmission of the data to the first port will complete.

7. The parallel computer system according to claim 1, wherein each of the plurality of processors reports information of the standby time to ports other than a port using which a corresponding processor is transmitting data.

8. The parallel computer system according to claim 1, wherein in the case of receiving information of the standby time from the plurality of processors, the first port allows the receiving of the arbitration request after a shortest standby time from among the received standby times elapses.

9. The parallel computer system according to claim 1, wherein the idle state is a state in which the first port is not transferring data, or in which the first port is not receiving the arbitration request.

10. The parallel computer system according to claim 1, wherein the standby time is a number of clock cycles until the transmission of the data to the first port will complete, and the first processor computes the number of clock cycles based on types of processing that execute reads and writes.

11. The parallel computer system according to claim 1, wherein the first processor suppresses selecting a communication authorization notification transmitted from the second port while the first processor selects a transmission destination coupled to the first port.

12. A crossbar switch coupled to a plurality of processors including a first processor, the crossbar switch comprising:

a plurality of ports including a first port configured to:

receive an arbitration request for data from the first processor while in an idle state receive the data from the first port, when the first port is a master port which is set to preferentially receive data from the first processor without arbitration, receive a standby time corresponding to a length of the data from the first processor, when the first port is not a master port, transmit a communication authorization notification to authorize the arbitration request to the first processor after the standby time elapses, and receive the data from the first processor.

13. A method executed by a first processor among a plurality of processors in a parallel computer system, the parallel computer system including a crossbar switch coupled to the plurality of processors via a plurality of ports of the crossbar switch, the method comprising:

transmitting an arbitration request for requesting receiving data to a first port and a second port among the plurality of ports;

transmitting the data to the first port, when the first port is a master port which is set to preferentially receive data from the first processor without arbitration when receiving the arbitration request from the first processor while in an idle state;

calculating a standby time corresponding to a length of the data;

transferring the calculated standby time to the second port;

receiving a communication authorization notification to authorize the arbitration request from the second port after the calculated standby time elapses; and transferring another data to one of the plurality of second processors via the second port in response to the communication authorization notification.

* * * * *